(12) United States Patent
Pham et al.

(10) Patent No.: US 6,787,513 B1
(45) Date of Patent: Sep. 7, 2004

(54) AZEOTROPE-LIKE COMPOSITIONS OF PENTAFLUOROPROPANE AND CHLOROPROPANE

(75) Inventors: Hang T. Pham, Amherst, NY (US); Gary Knopeck, Lakeview, NY (US); Ronald Riegal, Buffalo, NY (US); Mary C. Bogdan, Buffalo, NY (US); Leslie Bement, Amherst, NY (US); David J. Williams, Amherst, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/454,310

(22) Filed: Jun. 4, 2003

(51) Int. Cl.[7] ................................................ C11D 17/00
(52) U.S. Cl. ........................ 510/408; 510/412; 510/415
(58) Field of Search ................................. 510/408, 412, 510/415

(56) References Cited

U.S. PATENT DOCUMENTS

| | | | | |
|---|---|---|---|---|
| 5,523,333 A | * | 6/1996 | Fishback et al. | ............ 521/131 |
| 5,895,793 A | * | 4/1999 | Kitamura et al. | ............. 516/10 |
| 6,514,928 B1 | * | 2/2003 | Bement et al. | ............. 510/415 |

* cited by examiner

*Primary Examiner*—John M. Cooney
(74) *Attorney, Agent, or Firm*—Colleen D. Szuch

(57) ABSTRACT

This invention provides azeotrope-like compositions of 1,1,1,3,3-pentafluoropropane and 2-chloropropane that are environmentally desirable for use as refrigerants, aerosol propellants, metered dose inhalers, blowing agents for polymer foam, heat transfer media, and gaseous dielectrics.

15 Claims, No Drawings

AZEOTROPE-LIKE COMPOSITIONS OF PENTAFLUOROPROPANE AND CHLOROPROPANE

FIELD OF THE INVENTION

The present invention relates to azeotrope-like compositions of pentafluoropropane and chloropropane, to methods of using such compositions, and to blown foams formed using such compositions.

BACKGROUND

Fluorocarbon based fluids have found widespread use in industry in a number of applications, including, as refrigerants, aerosol propellants, blowing agents, blowing agents, heat transfer media, and gaseous dielectrics. Because of the suspected environmental problem associated with the use of some of these fluids, especially chlorofluorocarbons ("CFCs"), it is desirable to use fluids of lesser ozone depletion potential such as hydrofluorocabons ("HFCs") and/or hydochlorofluorocaborns ("HCFCs).

Thus, the use of fluids that do not contain CFCs or contain HCFCs or HFCs instead of CFCs is desirable. Additionally, it is known that the use of single component fluids or azeotropic mixtures, which mixtures do not fractionate on boiling and evaporation, is preferred in many application, including as blowing agents in the production of foams. For example, low-density rigid foams, such as polyurethane and polyisocyanurate foams, are used in a wide variety of applications including insulation for roofing systems, building panels, refrigerators and freezers. To be useful in such applications, it is critical for the foams to exhibit, among other properties, relatively high thermal insulation. One measure of a foam's thermal insulation properties is its "k-factor". The term "k-factor" refers generally to the rate of transfer of heat energy by conduction through one square foot of one inch thick homogenous material in one hour where there is a difference of one degree Fahrenheit perpendicularly across the two surfaces of the material. Since the utility of many closed-cell foams is based, at least in part, upon their thermal insulation properties, it is advantageous and desirable to produce rigid foams having low k-factors.

Known methods for producing rigid foams generally comprise an organic polyisocyanurate and a polyol in the presence of a blowing agent to form a rigid foam See, for example, Saunders and Frisch, Volumes I and II Polyurethanes Chemistry and Technology (1962), which is incorporated herein by reference. While the thermal properties of foams produced by these conventional methods may be adequate for selected applications, there is a constant need in the art to identify methods for producing foams having k-factors at least as low or lower than the produced via conventional methods.

However, the identification of new, environmentally safe, azeotropic mixtures, particularly those well suited for use as blowing agents, is complicated due to the fact that azeotrope formation is not readily predictable.

DETAILED DESCRIPTION OF PREFERRED EMBODIMENTS

The present inventors have developed compositions that can help to satisfy the continuing need for substitutes for CFCs and HCFCS. In one embodiment, the present invention provides azeotrope-like compositions comprising 1,1,1,3,3-pentafluoropropane ("HFC-245fa") and 2-chloropaae.

The preferred compositions of the invention provide environmentally desirable replacements for curently used CFC's and HCFC's. Additionally, the compositions of the invention exhibit characteristics that make the compositions better CFC and HCFC substitutes than either or 1,1,1,3,3-pentafluoropropane or 2-chloropropane alone.

One aspect of the invention provides a method for producing foams, preferably foams with relatively low k-factors. Applicants have discovered that foam blowing agents which comprise the compositions of the present invention are unexpectedly capable of providing foams and methods for producing foams with substantial advantage over prior foams and processes. More particularly, applicants have counter-intuitively discovered that the use of compositions comprising chloropropane and HFC-245fa as a blowing agent produces foam cells that have a higher percentage of HFC-245 in the cell gas than when HFC-245fa is used alone as the blowing agent. This aspect of the present intention can be an advantage in certain embodiments, especially those requiring a foam with improved flammability resistance and/or thermal properties. This is because HFC 245fa is less flammable than and/or has thermal properties superior to many of the other ingredients in the foamable composition, including alternative blowing the agents. In preferred embodiments, the present invention provides blowing agent comprising, and preferably consisting of, from about 20 wt % to about 80 wt % HFC-245fa and from about 20 wt % to about 80 wt % of 2-chloropropoane, and even more preferably from about 25 wt % to about 75 wt % HFC-245fa and from about 25 wt % to 75 wt % of 2-chloropropoane.

The blowing agent aspects of the invention do not necessarily require that the HFC-245fa/2-chloropropane is present in the form of an azeotrope-like composition. It is contemplated, however, that the preferred blowing agents of the present invention will comprise azeotrope-like compositions of pentafluoropropane and chloropropane.

The preferred foams of the present invention preferably have closed cells containing gas comprising HFC-245fa in a concentration that is at least about 1.5 times, and even more preferably at least about 2 times, the concentration of HFC-245fa in the foamable composition used to form the foam. In certain preferred embodiments, the foams of the present invention have closed cells containing contain gas comprising HFC-245fa in a concentration that is greater than 3 times the concentration of HFC-245fa in the blowing agent used.

Preferred forms to the present invention also exhibit the ability of inhibiting undesirable decomposition during the foaming reaction.

Another aspect of the present invention is a closed-cell foam produced according to the methods of the present invention.

Another aspect of the present invention is the provision of azeotrope-like compositions. As used herein, the term azeotrope-like is intended in its broad sense to include both compositions that are strictly azeotropic and compositions that behave like azeotropic mixtures. From fundamental principles, the thermodynamic state of & fluid is defined by pressure, temperature, liquid composition, and vapor composition. An azeotropic mixture is a system of two or more components in which the liquid composition and vapor composition are equal at the state pressure and temperature. In practice, this means that the components of an ozeotropic mixture are constant boiling and cannot be separated during a phase change.

As the term is used herein, "ezeotrope-like" compositions behave like azeotropic mixtures, that is, they are constant boiling or essentially constant boiling. In other words, for azeotrope-like compositions, the composition of the vapor formed during boiling or evaporation is identical, or substantially identical, to the original liquid composition. Thus, with boiling or evaporation, the liquid composition changes, if at all, only to a minimal or negligible extent. This is to be contrasted with non-azeotrope-like compositions in which, during boiling or evaporation, the liquid composition changes to a substantial degree. All azeotrope-like compositions of the invention within the indicated ranges as well as certain compositions outside these ranges are azeotrope-like, The azeotrope-like compositions of the invention may include additional components that do not form new azeotropic or azeotrope-like systems, or additional components that are not in the first distillation cut. The first distillation cut is the first cut taken after the distillation column displays steady state operation under total reflux conditions. One way to determine whether the addition of a component forms a new azeotopic or azeotrope-like system so as to be outside of this invention is to distill a sample of the composition with the component under conditions that would be expected to separate a non-azeotrope mixture into its separate components. If the mixture containing the additional component is non-azeotropic or non-azeotrope-like, the additional component will fractionate from the azeotropic or azeotrope-like components. If the mixture is azeotrope-like, some finite amount of a first distillation cut will be obtained that contains all of the mixture components that is constant boiling or behaves as a single substance.

It follows from this that another characteristic of azotrope-like compositions is that there is a range of compositions containing the same components in varying proportions that are azeotrope-like or constant boiling. All such compositions are intended to be covered by the terms "azeotrope-like" and "constant boiling". As an example, it is well known that at differing pressures, the composition of a given azeotrope will vary at least slightly, as does the boiling point of the composition. Thus, an azeotrope of A and B represents a unique of type of relationship, but with a variable composition depending on temperature and/or pressure. It follows that, for azeotrope-like compositions, there is a range of compositions containing the same components in varying proportions that are azeotrope-like. All such compositions are intended to be covered by the term azeotrope-like as used herein.

The present invention provides azeotrope and azeotrope-like compositions comprising 1,1,1,3,3-pentafluoropropane and 2-chloropropane. Preferably the novel azeotrope-like compositions of the present invention comprise effective amounts of 1,1,1,3,3-pentafluoropropane and 2-chloropropane. The term "effective amounts" as used herein refers to the amount of each component which upon combination with the other component or components, results in the formation of the present azeotrope-like compositions These embodiments perferably provide azeotrope-like compositions comprising, and preferably consisting essentially of, from about 10 to about 99 pats by weight HFC-245fa, and from about 1 to about 90 pats by weight of 2-chlorpropane, more preferably from about 40 to about 99 parts by weight HFC-245fa, and from about 1 to about 60 parts by weight of 2-chloropropane, and even more preferably from about 60 to about 98 parts by weight HFC-245fa, and from about 2 to about 40 parts by weight of 2-chloropropane. In highly preferred embodiments, the present compositions consist essentially of from about 90 to about 99 parts by weight HFC-245fa and from about 1 to about 10 parts by weight of 2-chloropropane, and even more preferably from about 95 to about 99 parts by weight HFG245fa and from about 1 to about 5 parts by weight of 2-chloropropane.

Preferred compositions of the present invention are characterized by a boiling point of about 14.54° C. ±4° C., preferably ±2° C., more preferably ±1° C. at 14.49 psia. Table 1 below provides boiling point data for compositions according to preferred embodiments of the present invention.

TABLE 1

| Wt % 2-chloropropane (with the remainder being 245fa) | Boiling Pt. (° C. at 14.49 psia) |
| --- | --- |
| 0 | 14.61 |
| 0.19 | 14.56 |
| 0.57 | 14.56 |
| 1.31 | 14.55 |
| 2.05 | 14.54 |
| 2.77 | 14.55 |
| 4.18 | 14.56 |
| 5.55 | 14.57 |
| 6.89 | 14.63 |
| 8.19 | 14.67 |
| 9.45 | 14.74 |
| 10.67 | 14.80 |
| 11.87 | 14.85 |
| 13.03 | 14.91 |
| 14.16 | 14.97 |
| 15.27 | 15.04 |
| 16.34 | 15.12 |
| 17.39 | 15.15 |
| 18.41 | 15.23 |
| 19.41 | 15.29 |
| 20.39 | 15.35 |

The compositions of the present invention may be used in a wide variety of applications as substitutes for CMCs and for compositions containing less desirable HCFCs. For example, the present compositions are useful as solvents, blowing agents, refrigerants, cleaning agents and aerosols.

One embodiment of the present invention relates to a blowing agent comprising one or more of the present compositions. In other embodiments, the invention provides foamable compositions, and preferably polyurethane polyisocyanurate foam compositions, and methods of preparing foams. In such foam embodiments, one or more of the present compositions, and preferably azeotrope-like compositions, are included as a blowing agent in a foamable composition, which composition perferably includes one or more additional components capable of reacting and foaming under the proper conditions to form a foam or cellular structure, as is well known in the art. The present methods preferably comprise providing such a foamable composition and reacting it under conditions effective to obtain a foam, and preferably a closed cell foam. The invention also relates to foam, and preferably closed cell foam, prepared from a polymer foam formulation containing a blowing agent comprising a composition of the present invention, and preferably an azeotrope-like composition of the invention.

Any of the methods well known in the art such as those described in "Polyurethanes Chemistry and Technology," Volumes I and II, Saunders and Frisch, 1962, John Wiley and Sons, New York, N.Y., which is incorporated herein by reference, way be used or adapted for use in accordance with the foam embodiments of the present invention. In general, such preferred methods comprise preparing polyurethane or polyisocyanurate foams by combining I hit arean isocyanate, a polyol or mixture of polyols, a blowing agent or mixture of blowing agents comprising one or more of the present compositions, and other materials such as catalyst so well as, surfactants, and optionally, flame retardants, colorants, or other additives. It is convenient in many applications to provide the components for polyurethane or polyisocyanurate foams in pre-blended formulations. Most typically, the foam formulation is pre-blended into two components. The isocyanate and optionally certain surfactants and blowing agents comprise the first component, commonly referred to as the "A" component. The polyol or polyol mixture, surfactant, catalysts, blowing agents flame retardant, and other isocyanate reactive components comprise the second component, commonly referred to as the "B" component. Accordingly, polyurethane or polyisocyanurate foams are readily prepared by bringing together the A and B side components either by hand mix for small preparations and preferably, machine mix techniques to form blocks, pour-in-place panels and other items, spray applied foams, froths, and the like. Optionally, other ingredients such as fire retardants, colorants, auxiliary blowing agents, and even other polyols can be added as a third stream to the mix head or reaction site. Most conveniently, however, they are all incorporated into one B-component as described above.

It is also possible to produce thermoplastic foams using the compositions of the invention. For example, conventional foam polyurethanes and isocyanurate fomulations may be combined with the azeotrope-like compositions in a conventional manner to produce rigid foams.

Azeotrope-like mixtures containing HFC-245fa in accordance with the present invention an particularly suitable as foam blowing agents since foams blown with HFC-245fa have been found to possess low relative initial and aged thermal conductivity and good dimensional stability at low temperature. Of particular interest are those azeotrope-like compositions of the present invention that optionally further contain other zero or low zone depleting materials such as, for example, other hydro-fluorocarbons, e.g, difluoromethane (HFC-32); difluoroethane (HFC-152); trifluoroethane (HFC-143); tetrafluoroethane (HFC-134); pentafluoroethane (HFC-125); pentafluoropropane (HFC-245); hexafluoropropane (HFC-236); heptafluoropropane (HFC-227); pentafluorobutane (HFC-365) and inert gases, e.g. air, nitrogen, carbon dioxide. Where isomerism is possible for the hydyofluorocarbons mentioned above, the respective isomers may be, used either singly or in the form of a mixture.

Dispersing agents, cell stabilizers, and surfactants may also be incorporated into the blowing agent mixture. Surfactants, most notably silicone oils, are added to serve as cell stabilizers. Some reprsentative materials are sold under the names of DC-193,B-8404, and L-5340 which are, generally, polysiloxane polyoxyalkylene block co-polymers such as those disclosed in U.S. Pat. Nos. 2,834,748, 2,917,480, and 2,846,458. Other optional additives for the blowing agent mixture may include flame retardants such as tri(2-chloroethyl)phosphate, tri(2-choropropyl)phosphate, tri(2,3-dibromopropyl)-phosphate, tri(1,3-dichloropropyl) posphate, diammonium phosphate, various halogenated aromatic compounds, antimony oxide, aluminum trihydrate, polyvinyl chloride, and the like. In another embodiment, the azeotrope-like compositions of this invention may be used as propellants in sprayable compositions, either alone or in combination with known propellants. The sprayable composition comprises, consists essentially of, and consists of a material to be sprayed and a propellant comprising, consisting essentially of, and consisting of the azeotrope-like compositions of the invention. Inert ingredients, solvents, and other materials may also be present in the sprayable mixture. Preferably, the sprayable composition is an aerosol. Suitable materials to be sprayed include, without limitation, cosmetic materials such as deodorants, perfumes, hair sprays, cleansers, and polishing agents as well as medicinal materials such as anti-asthma and anti-halitosis medications.

In general, the amount of blowing agent present in the blended mixture used to form the foamable composition of the present invention is dictated by the desired foam densities of the final polyurethane or polyisocyanurate foams products. The polyurethane foams produced can vary in density from about 0.5 pound per cubic foot to about 40 pounds per cubic foot, preferably from about 1.0 to about 20.0 pounds per cubic foot, and most preferably from about 1.5 to about 6.0 pounds per cubic foot for rigid polyurethane foams and from about 1.0 to about 4.0 pounds per cubic foot for flexible foams. The density obtained is a function of several factors, including how much of the blowing agent, or blowing agent mixture, is present in the A and/or B components, or that is added at the time the foam is prepared.

The components of the composition of the invention are known materials that are commercially available or may be prepared by known methods. Preferably, the components are of sufficiently high purity so as to avoid the introduction of adverse influences upon cooling or heating properties, constant boiling properties or blowing agent properties of the system. In the case of metered dose inhalers, the relevant current Good Manufacturing Process may be used for manufacturing these materials.

Additional components may be added to tailor the properties of the azeotrope-like compositions of the invention as needed. By way of example, oil solubility aids may be added in the case in which the compositions of the invention are used as refrigerants. Stabilizers and other materials may also be added to enhance the properties of the compositions of the invention.

EXAMPLES

Example 1

An ebulliometer consisting of vacuum jacketed tube with a condenser on top was used. About 25 g HFC-245fa is charged to the ebulliometer and then 2-chloropropane is added in small, measured increments. Temperature depression is observed when the 2-chloropropane is added to the HFC-245fa, indicating a minimum boiling azeotrope is formed. From just above zero weight percent to about 3.5 weight percent of 2-chloropropane, the boiling point of the composition changes by about 0.05 C. Therefore, the composition exhibits azeotrope and/or azeotrope-like properties over this range.

Example 2

One aspect of the invention is further illustrated by the following example, in which parts or percentages are by weight unless otherwise specified. The following materials are used in the example Polyol: A polyester polyol with an OH number of 240 containing a compatibilizer to aid miscibility.

HFC-245fa 2-chloropropane

Surfactant A: A polysiloxane polyether surfactant

Catalyst D: A trimerization catalyst

Three foams ("Experiment 1," "Experiment 2" and "Experiment 3") are prepared by a general procedure commonly referred to as "handmixing". For each blowing agent, a premix of polyol, surfactant, and catalysts is prepared in the proportions indicated in Table 2. About 100 grams of each formulation is blended. The premix is blended in a 32 oz paint can, and stirred at about 1500 rpm with a Conn 2" diameter ITC mixer until 'a homogeneous blend is achieved.

When mixing is complete, the can containing the mix is covered and placed in a refrigerator controlled at 50° F. The foam blowing agent or pre-blended pair of blowing agents for experiment 1 is also stored in pressure bottles at 50° F. The A-component is kept in sealed containers at 70° F.

The pre-cooled blowing agent is added in the indicated amount to the premix. The contents are stirred for two minutes with a Conn 2" ITC mixing table turning at 1000 rpm. Following this, the mixing vessel and contents are reweighed. If there is a weight loss, the blowing agent is added to the solution to make up any weight loss. The can is than covered and replaced in the refrigerator.

After the contents had cooled again to 50° F., approximately 10 minutes, the mixing vessel is removed from refrigerator and taken to the mixing station. A pre-weighted portion of A-component, isocyanurate, is added quickly to the B-component, the ingredients mixed for 10 seconds using a Conn 2" diameter ITC mixing blade at 3000 rpm and poured into a 8"×8"×4" cardboard cake box and allowed to rise. The resulting rigid foam is inspected and found to be of good quality. The composition of the gas contained in the cells of the foam is analyzed and found to have the concentrations indicated in Table 2.

| Component | Experiment 1 | Experiment 2 | Experiment 3 |
| --- | --- | --- | --- |
| Blowing Agent, Wt % | | | |
| 2-Chloropropane | 0 | 25 | 75 |
| 245fa | 100 | 75 | 25 |
| Foam Formulation, gm | | | |
| Polyester polyol | 100 | 100 | 100 |
| Silicone surfactant | 2 | 2 | 2 |
| Phosphorous flame ret | 5 | 5 | 5 |
| Catalyst A | 0.3 | 0.3 | 0.3 |
| Catalyst B | 3.6 | 3.6 | 3.6 |
| Water | 0.5 | 0.5 | 0.5 |
| 2-chloropropane | 0 | 6.4 | 20.25 |
| 245fa | 51.5 | 36.6 | 12.88 |
| Cell Gas, Wt % | | | |
| 2-chloropropane | 0 | 8.21 | 42.14 |
| 245fa | 58.62 | 69.27 | 32.47 |
| Nitrogen | 29.81 | 17.7 | 19.37 |
| Oxygen | 10.14 | 3.9 | 4.19 |
| Carbon Dioxide | 0.22 | 0.27 | 0.53 |
| Other | 1.21 | 0.65 | 1.30 |

As can be seen from the results of Example 2, the use of a composition of the present invention as a blowing agent results in a relatively high level of retention of HCFC-245fa in the foam cell. More paticularly, the concentration of HCFC-245fa in the cell gas in Experiment 2 is greater than about 1.5 times the concentration in the foamable composition.

What is claimed is:

1. Azeotrope-like compositions consisting essentially of from about 1 to about 90 weight percent 2-chloropropane and from about 10 to about 99 weight percent HFC-245fa.

2. The azeotrope-like compositions of claim 1 consisting essentially of from about from about 1 to about 40 weight percent 2-chlropropane and from about 60 to about 99 weight percent HFC-245fa.

3. The azeotrope-like compositions of claim 1 consisting essentially of from about 1 to about 10 weight percent 2-chiropropane and from about 99 to about 90 weight percent HFC-245fa.

4. A blowing agent composition comprising the azeotrope-like compositions of claim 1.

5. A blowing agent composition comprising the azeotrope-like compositions of claim 2.

6. A blowing agent composition comprising the azeotrope-like compositions of claim 3.

7. The azeotrope-like compositions of claim 1 having a boiling point of about 14.46° C. ±4 at 14.46 psia.

8. The azeotrope-like compositions of claim 1 having a boiling point of about 14.54° C. ±4 at 14.49 psia.

9. The azeotrope-like compositions of claim 1 having a boiling point of about 14.46° C. ±1 at 14.46 psia.

10. The azeotrope-like compositions of claim 1 having a boiling point of about 14.54° C. ±1 at 14.49 psia.

11. Azeotrope-like compositions comprising from about 1 to about 90 weight percent 2-chloropropane and from about 10 to about 99 weight percent HFC-245fa.

12. The azeotrope-like compositions of claim 11 having a boiling point of about 14.46° C. ±4 at 14.46 psia.

13. The azeotrope-like compositions of claim 11 having a boiling point of about 14.54° C. ±4 at 14.49 psia.

14. The azeotrope-like compositions of claim 11 having a boiling point of about 14.46° C. ±1 at 14.46 psia.

15. The azeotrope-like compositions of claim 11 having a boiling point of about 14.54° C. ±1 at 14.49 psia.

* * * * *